United States Patent
Reza et al.

(10) Patent No.: US 11,100,303 B2
(45) Date of Patent: Aug. 24, 2021

(54) METHOD, SYSTEM AND APPARATUS FOR AUXILIARY LABEL DETECTION AND ASSOCIATION

(71) Applicant: Zebra Technologies Corporation, Lincolnshire, IL (US)

(72) Inventors: Shoja Ghiass Reza, Mississauga (CA); Joseph Lam, North York (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/214,752

(22) Filed: Dec. 10, 2018

(65) Prior Publication Data

US 2020/0184170 A1   Jun. 11, 2020

(51) Int. Cl.
*G06K 7/14* (2006.01)
*G09F 3/00* (2006.01)

(52) U.S. Cl.
CPC ......... *G06K 7/1443* (2013.01); *G09F 3/0291* (2013.01)

(58) Field of Classification Search
CPC .. G06K 7/00; G06K 7/10; G06K 7/14; G06K 7/1443
USPC ................................ 235/454, 439, 375, 487
See application file for complete search history.

(56) References Cited

U.S. PATENT DOCUMENTS

| | | | |
|---|---|---|---|
| 5,209,712 A | 5/1993 | Ferri | |
| 5,214,615 A | 5/1993 | Bauer | |
| 5,408,322 A | 4/1995 | Hsu et al. | |
| 5,414,268 A | 5/1995 | McGee | |
| 5,534,762 A | 7/1996 | Kim | |
| 5,566,280 A | 10/1996 | Fukui et al. | |
| 5,953,055 A | 9/1999 | Huang et al. | |
| 5,988,862 A | 11/1999 | Kacyra et al. | |
| 6,026,376 A | 2/2000 | Kenney | |
| 6,034,379 A | 3/2000 | Bunte et al. | |
| 6,075,905 A | 6/2000 | Herman et al. | |
| 6,115,114 A | 9/2000 | Berg et al. | |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

"Fair Billing with Automatic Dimensioning" pp. 1-4, undated, Copyright Mettler-Toledo International Inc.

(Continued)

*Primary Examiner* — Edwyn Labaze

(57) ABSTRACT

A method of auxiliary label detection includes: at an imaging controller, obtaining (i) an image of a support structure and (ii) a plurality of primary label indicators each defining a position of a primary label within the image; at the imaging controller, selecting a detection region from the image based on a reference indicator; at the imaging controller, detecting an auxiliary label within the detection region based on predefined visual attributes of the auxiliary label; at the imaging controller, selecting one of the primary label indicators based on proximity between the auxiliary label and the selected primary label indicator; updating the selected primary label indicator with an identifier of the auxiliary label; and storing the updated primary label indicator in a memory.

16 Claims, 12 Drawing Sheets

(56) References Cited

U.S. PATENT DOCUMENTS

| | | | |
|---|---|---|---|
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0127176 A1* | 6/2005 | Dickinson .......... G06K 17/0029 235/385 |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |

(56) References Cited

U.S. PATENT DOCUMENTS

| | | |
|---|---|---|
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214438 A1* | 7/2014 | Ahmadi .......... A61J 1/035 705/2 |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |

(56) References Cited

U.S. PATENT DOCUMENTS

| | | |
|---|---|---|
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0253735 A1 | 9/2016 | Scudillo et al. |
| 2016/0253844 A1 | 9/2016 | Petrovskaya et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0150129 A1 | 5/2017 | Pangrazio |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323376 A1 | 11/2017 | Glaser et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0251253 A1* | 9/2018 | Taira .................. G06Q 10/0875 |
| 2018/0281191 A1 | 10/2018 | Sinyavskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1* | 11/2018 | Lam ..................... G06K 9/6202 |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0087663 A1* | 3/2019 | Yamazaki ............ G06Q 10/087 |
| 2019/0108606 A1* | 4/2019 | Komiyama ............ G06Q 50/28 |
| 2019/0180150 A1 | 6/2019 | Taylor et al. |
| 2019/0197728 A1 | 6/2019 | Yamao |
| 2019/0236530 A1* | 8/2019 | Cantrell ............... G06Q 20/203 |
| 2019/0304132 A1* | 10/2019 | Yoda .................... G06K 7/1417 |
| 2019/0392212 A1 | 12/2019 | Sawhney et al. |
| 2020/0034782 A1* | 1/2020 | Hsieh ........................ G06N 3/08 |
| 2020/0143322 A1* | 5/2020 | Dearing ............. G06K 7/10861 |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report, Jan. 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Façade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France. [hal-01097361].

(56) References Cited

OTHER PUBLICATIONS

Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, Sep. 25-27, 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Ziang Xie et al., "Multimodal Blending for High-Accuracy Instance Recognition", 2013 IEEE RSJ International Conference on Intelligent Robots and Systems, p. 2214-2221.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passiv rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.

(56) References Cited

OTHER PUBLICATIONS

Puwein, J., et al."Robust Multi-view camera calibration for wide-baseline camera networks," in IEEE Workshop on Applications of computer vision (WACV), Jan. 2011.

Rusu, et al. "How to incrementally register pairs of clouds," PCL Library, retrieved from internet on Aug. 22, 2016 [http://pointclouds.org/documentation/tutorials/pairwise_incremental_registration.php].

Rusu, et al. "Spatial Change detection on unorganized point cloud data," PCL Library, retrieved from internet on Aug. 19, 2016 [http://pointclouds.org/documentation/tutorials/octree_change.php].

Schnabel et al. "Efficient RANSAC for Point-Cloud Shape Detection", vol. 0, No. 0, pp. 1-12 (1981).

Senthilkumaran, et al., "Edge Detection Techniques for Image Segmentation—A Survey of Soft Computing Approaches", International Journal of Recent Trends in Engineering, vol. 1, No. 2 (May 2009).

Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].

Tahir, Rabbani, et al., "Segmentation of point clouds using smoothness constraint," International Archives of Photogrammetry, Remote Sensing and Spatial Information Sciences 36.5 (Sep. 2006): 248-253.

Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.

Tseng, et al., "A Cloud Removal Approach for Aerial Image Visualization", International Journal of Innovative Computing, Information & Control, vol. 9, No. 6, pp. 2421-2440 (Jun. 2013).

Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).

United Kingdom Intellectual Property Office, "Combined Search and Examination Report" for GB Patent Application No. 1813580.6 dated Feb. 21, 2019.

United Kingdom Intellectual Property Office, Combined Search and Examination Report dated Jan. 22, 2016 for GB Patent Application No. 1417218.3.

United Kingdom Intellectual Property Office, Combined Search and Examination Report dated Jan. 22, 2016 for GB Patent Application No. 1521272.3.

United Kingdom Intellectual Property Office, Combined Search and Examination Report dated Mar. 11, 2015 for GB Patent Application No. 1417218.3.

Varol Gul et al: "Product placement detection based on image processing", 2014 22nd Signal Processing and Communication Applications Conference (SIU), IEEE, Apr. 23, 2014.

Varol Gul et al: "Toward Retail product recognition on Grocery shelves", Visual Communications and image processing; Jan. 20, 2004; San Jose, (Mar. 4, 2015).

Weber et al., "Methods for Feature Detection in Point clouds," visualization of large and unstructured data sets—IRTG Workshop, pp. 90-99 (2010).

Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).

\* cited by examiner

METHOD, SYSTEM AND APPARATUS FOR AUXILIARY LABEL DETECTION AND ASSOCIATION

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
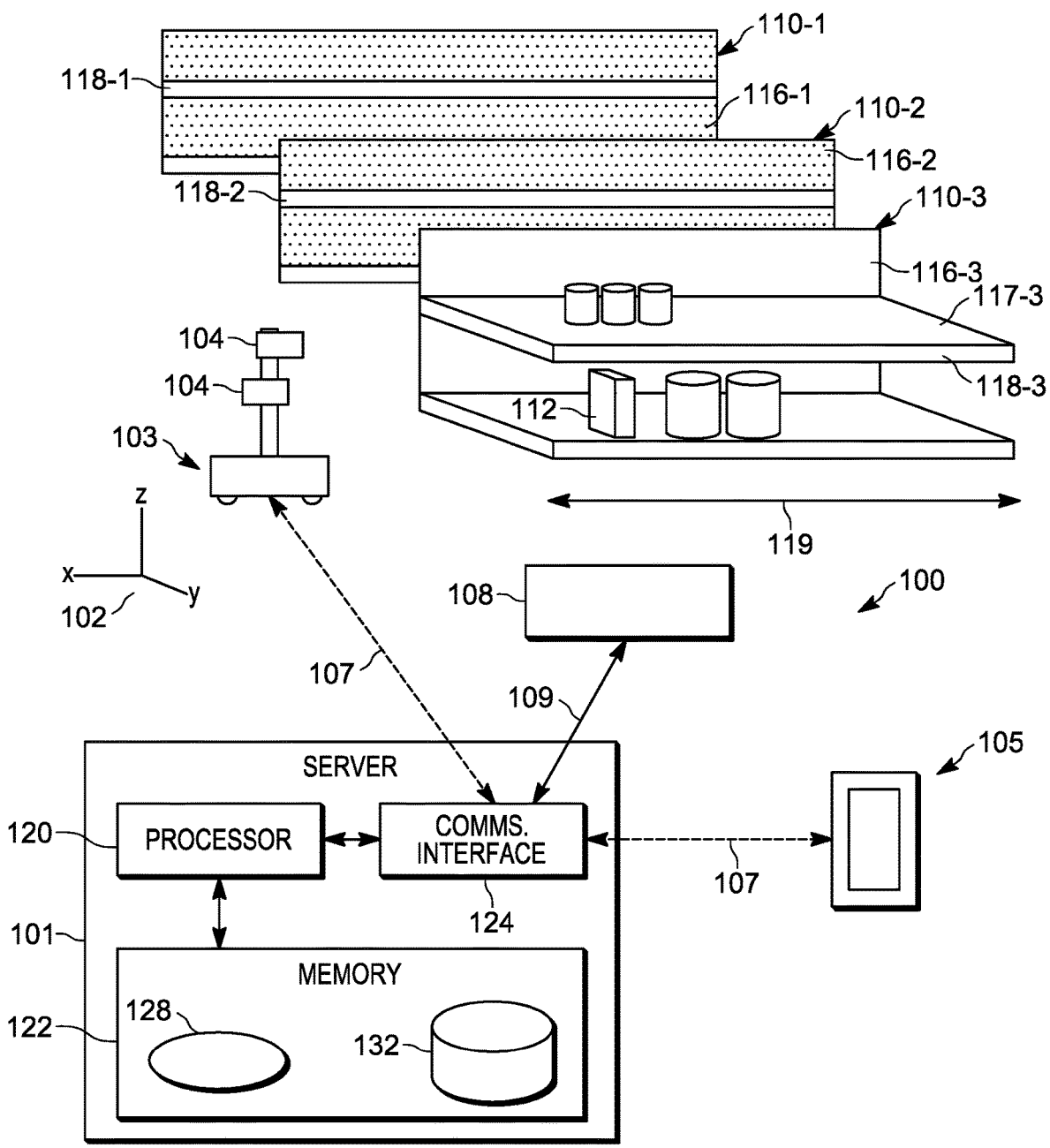
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of auxiliary label detection, comprising: at an imaging controller, obtaining (i) an image of a support structure and (ii) a plurality of primary label indicators each defining a position of a primary label within the image; at the imaging controller, selecting a detection region from the image based on a reference indicator; at the imaging controller, detecting an auxiliary label within the detection region based on predefined visual attributes of the auxiliary label; at the imaging controller, selecting one of the primary label indicators based on proximity between the auxiliary label and the selected primary label indicator; updating the selected primary label indicator with an identifier of the auxiliary label; and storing the updated primary label indicator in a memory.

Additional examples disclosed herein are directed to a computing device for auxiliary label detection, the computing device comprising: a memory storing (i) an image of a support structure and (ii) a plurality of primary label indicators each defining a position of a primary label within the image; an imaging controller connected to the memory, the imaging controller configured to obtain the image of the support structure and the plurality of primary label indicators; the imaging controller further configured to select a detection region from the image based on a reference indicator; the imaging controller further configured to detect an auxiliary label within the detection region based on predefined visual attributes of the auxiliary label; the imaging controller further configured to select one of the primary label indicators based on proximity between the auxiliary label and the selected primary label indicator; the imaging controller further configured to update the selected primary label indicator with an identifier of the auxiliary label; and the imaging controller further configured to store the updated primary label indicator in the memory.

Further examples disclosed herein are directed to a non-transitory computer-readable medium storing a plurality of computer-readable instructions executable by an imaging controller, wherein execution of the instructions causes the imaging controller to: obtain (i) an image of a support structure and (ii) a plurality of primary label indicators each defining a position of a primary label within the image; select a detection region from the image based on a reference indicator; detect an auxiliary label within the detection region based on predefined visual attributes of the auxiliary label; select one of the primary label indicators based on proximity between the auxiliary label and the selected primary label indicator; update the selected primary label indicator with an identifier of the auxiliary label; and store the updated primary label indicator in a memory.

FIG. 1 depicts a mobile automation system 100 in accordance with the teachings of this disclosure. The system 100 is illustrated as being deployed in a retail environment, but in other embodiments can be deployed in a variety of other environments, including warehouses, hospitals, and the like. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures such as shelf modules 110-1, 110-2, 110-3 and so on (collectively referred to as shelves 110, and generically referred to as a shelf 110—this nomenclature is also employed for other elements discussed herein). In other examples, additional types of support structures may also be present, such as pegboards. Each shelf module 110 supports a plurality of products 112, as well as labels and related objects, as will be discussed in greater detail below. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees. The shelf edges 118 define a front of the shelves 110, separated from the shelf backs 116 by a shelf depth. A common frame of reference 102 is illustrated in FIG. 1. In the present example, the shelf depth is defined in the Y dimension of the frame of reference 102, while the shelf backs 116 and shelf edges 118 are shown as being parallel to the XZ plane.

The apparatus 103 is deployed within the retail environment, and communicates with the server 101 (e.g. via the link 107) to navigate, autonomously or partially autonomously, along a length 119 (illustrated in FIG. 1 as being parallel to the X axis of the frame of reference 102) of at least a portion of the shelves 110. The apparatus 103, autonomously or in conjunction with the server 101, is configured to continuously determine its location within the environment, for example with respect to a map of the environment. The apparatus 103 may also be configured to update the map (e.g. via a simultaneous mapping and localization, or SLAM, process).

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 (e.g. according to the paths mentioned above) and to capture shelf data, such as point cloud and/or image data, during such navigation.

The server 101 includes a special purpose imaging controller, such as a processor 120, specifically designed to obtain data captured by the apparatus 103 via a communications interface 124 for storage in a repository 132, and to perform subsequent processing of the captured data. Such processing includes, as will be discussed herein, the detection of labels and auxiliary labels disposed on the shelves 110. Other examples of processing performed by the processor 120 include the detection of objects such as shelved products in the captured data as well as status information corresponding to the objects. The processor 120 can also be configured to control and/or assist the mobile automation apparatus 103 to navigate the environment and to capture the above-mentioned data.

The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as a memory 122 containing the above-mentioned repository 132, having stored thereon computer readable instructions for performing various functionality, including control of the apparatus 103 to capture shelf data, post-processing of the shelf data, and generating and providing certain navigational data to the apparatus 103, such as target locations at which to capture shelf data. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include an auxiliary label detection application 128, which may also be implemented as a suite of logically distinct applications. In general, via execution of the application 128 or subcomponents thereof and in conjunction with the other components of the server 101, the processor 120 is configured to implement various functionality related to obtaining captured data depicting the shelves 110 and performing various post-processing operations on the captured data to detect label objects therein.

The processor 120, as configured via the execution of the application 128, is also referred to herein as the above-mentioned imaging controller 120. As will now be apparent, some or all of the functionality implemented by the imaging controller 120 described below may also be performed by preconfigured special purpose hardware controllers (e.g. one or more logic circuit arrangements specifically configured to optimize the speed of image processing, for example via FPGAs and/or Application-Specific Integrated Circuits (ASICs) configured for this purpose) rather than by execution of the control application 128 by the processor 120.

Figure 2A:
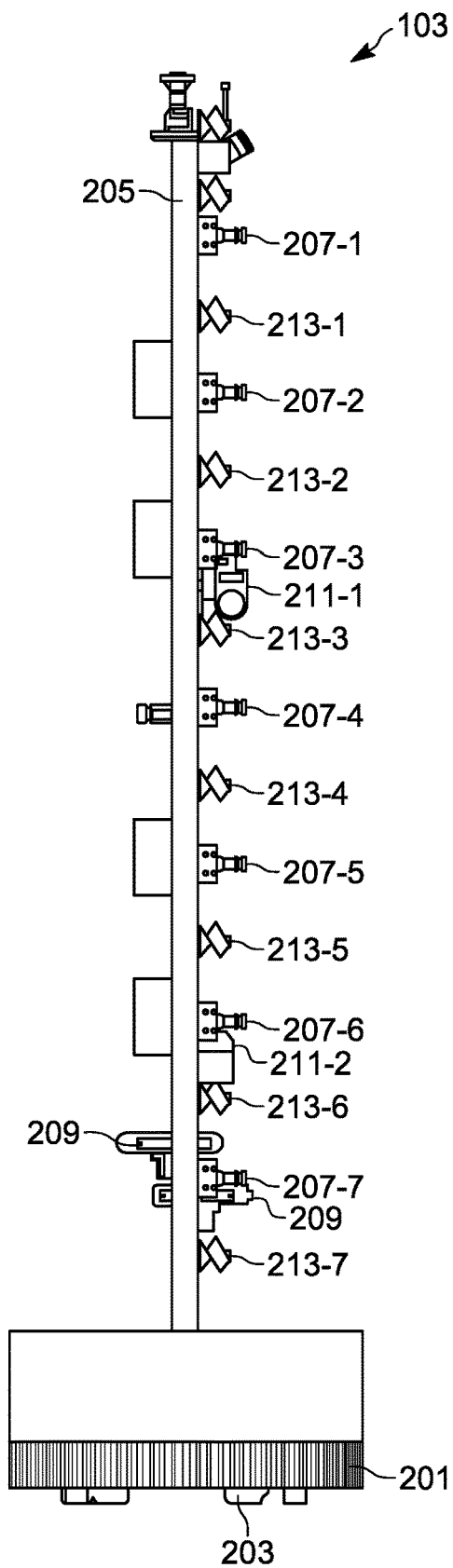
FIG. 2A depicts a mobile automation apparatus in the system of FIG. 1.
Figure 2B:
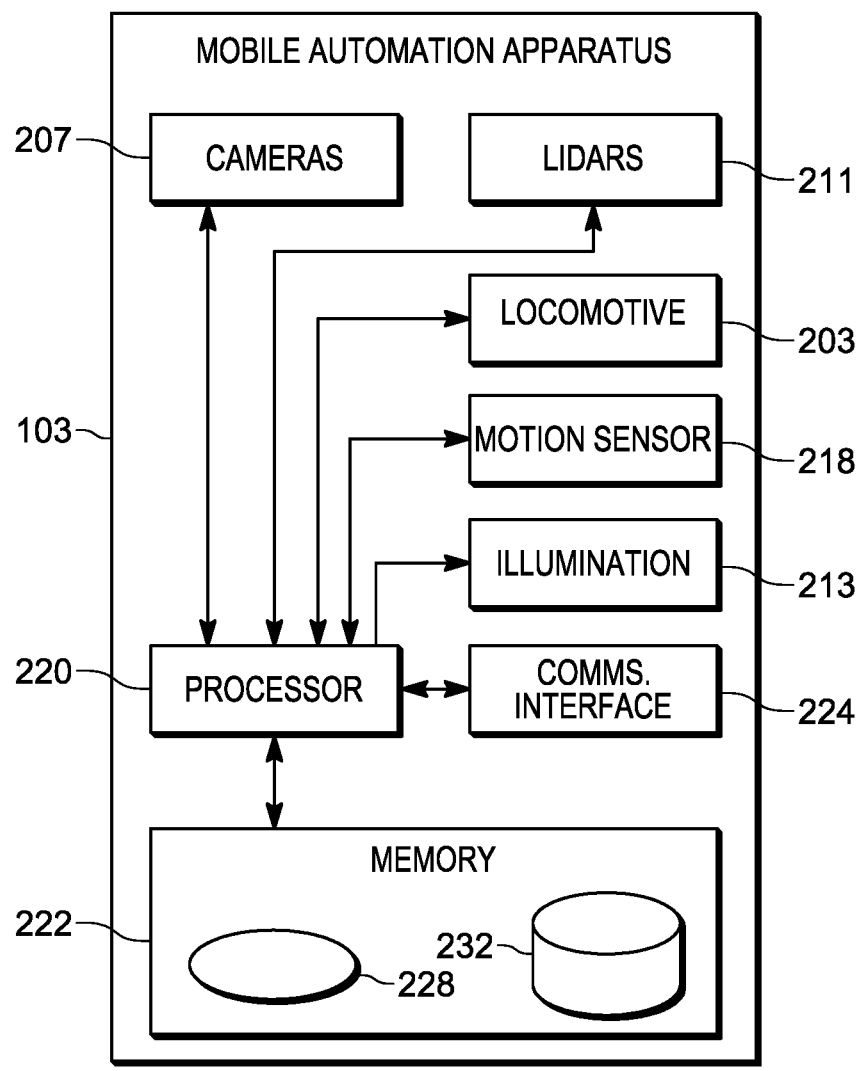
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in the common frame of reference 102 previously established in the retail facility, permitting data captured by the mobile automation apparatus 103 to be registered to the common frame of reference.

The mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions related to the navigation of the apparatus 103 and capture of data for subsequent processing, e.g. by the server 101. In some embodiments, such subsequent processing can be performed by the apparatus 103 itself via execution of the application 228. The application 228 may also be implemented as a suite of distinct applications in other examples.

The processor 220, when so configured by the execution of the application 228, may also be referred to as an imaging controller 220. Those skilled in the art will appreciate that the functionality implemented by the processor 220 via the execution of the application 228 may also be implemented by one or more specially designed hardware and firmware components, including logic circuit configurations optimized for image and/or depth sensor data processing, such as via specifically configured FPGAs, ASICs and the like in other embodiments.

The memory 222 may also store a repository 232 containing, for example, one or more maps representing the environment in which the apparatus 103 operates, for use during the execution of the application 228. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

As will be apparent in the discussion below, other examples, some or all of the processing performed by the server 101 may be performed by the apparatus 103, and some or all of the processing performed by the apparatus 103 may be performed by the server 101. That is, although in the illustrated example the application 128 resides in the server 101, in other embodiments some or all of the actions described below to determine the shelf depth of the shelves 110 from captured data may be performed by the processor 220 of the apparatus 103, either in conjunction with or independently from the processor 120 of the server 101. As those of skill in the art will realize, distribution of such computations between the server 101 and the mobile automation apparatus 103 may depend upon respective processing speeds of the processors 120 and 220, the quality and bandwidth of the link 107, as well as criticality level of the underlying instruction(s).

Figure 3:
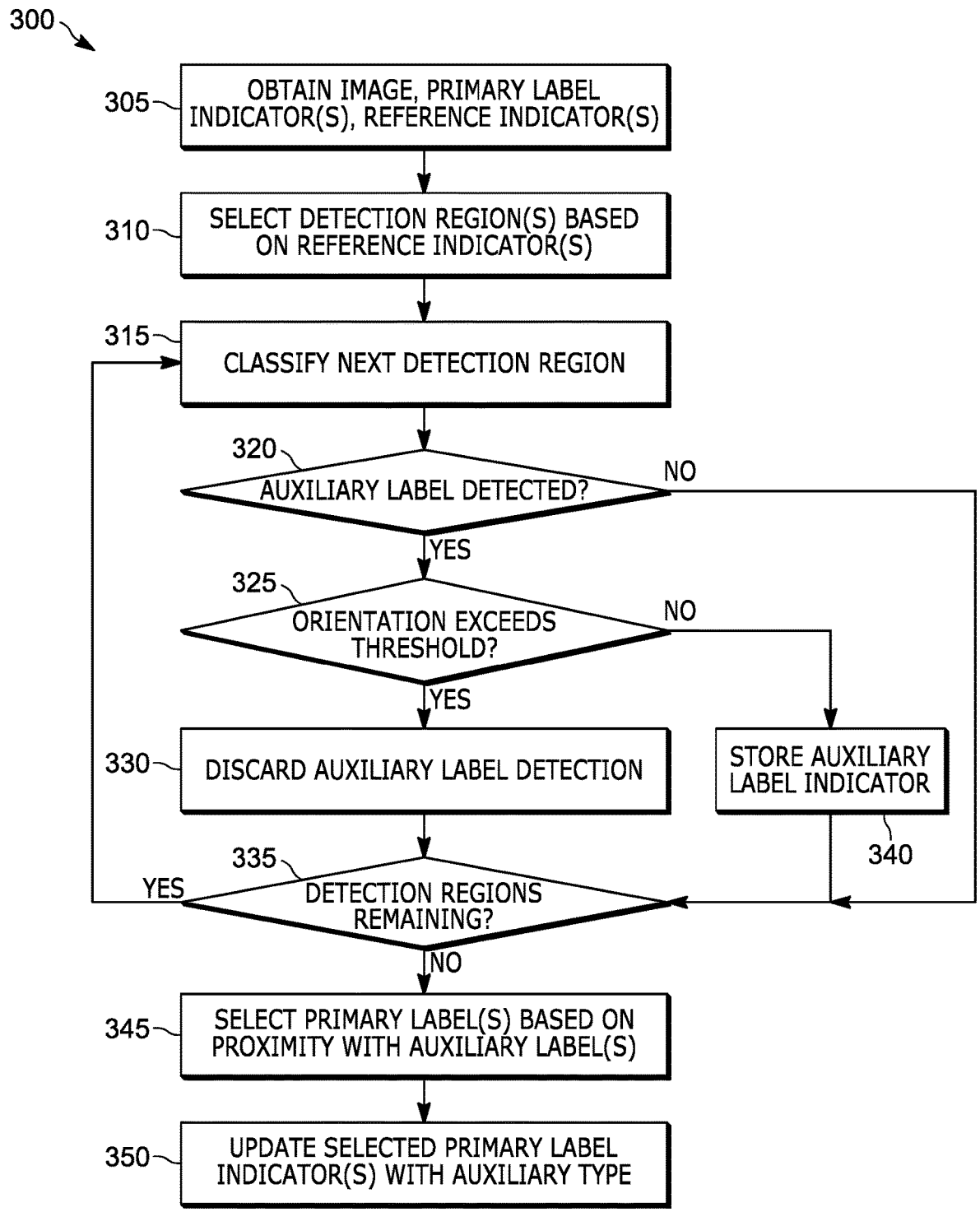
FIG. 3 is a flowchart of a method for detecting auxiliary labels.

The functionality of the application 128 will now be described in greater detail. In particular, the support structure depth determination mentioned above will be described as performed by the server 101. Turning to FIG. 3, a method 300 of detecting auxiliary labels is shown. The method 300 will be described in conjunction with its performance by the server 101, with reference to the components illustrated in FIG. 1.

At block 305, the server 101 is configured to obtain an image of a support structure, such as one or more shelf modules 110 as illustrated in FIG. 1. The image obtained at block 305 may be obtained by retrieval from the repository 132. For example, the image may have been previously provided to the server 101 for storage in the repository 132 by the apparatus 103.

The server 101 is also configured, at block 305, to obtain a plurality of primary label indicators and a plurality of reference indicators. As will be understood by those skilled in the art, retail environments such as that depicted in FIG. 1 typically include a plurality of labels disposed on the shelves 110 (e.g. on the shelf edges 118). Each label may contain, for example, a barcode or other machine-readable indicium encoding an identifier of a product 112. Each label may also contain other information, such as a price of the corresponding product 112, a name of the corresponding product 112, or the like. Primary label indicators obtained at block 305 indicate at least a position of a corresponding primary label within the image. The position can take the form, for example, of a bounding box defined by image coordinates for the corners of the bounding box.

The primary label indicators can also include data extracted from the image, such as data decoded from a barcode of the primary label, a price string extracted (e.g. via optical character recognition, OCR) from the image of the label, and the like. The primary label indicators can also include, in some examples, bounding boxes for components of the primary label. For example, a primary label indicator can include a first bounding box for the label, as well as a second bounding box within the first bounding box and indicating a position of a barcode on the label.

Figure 4A:
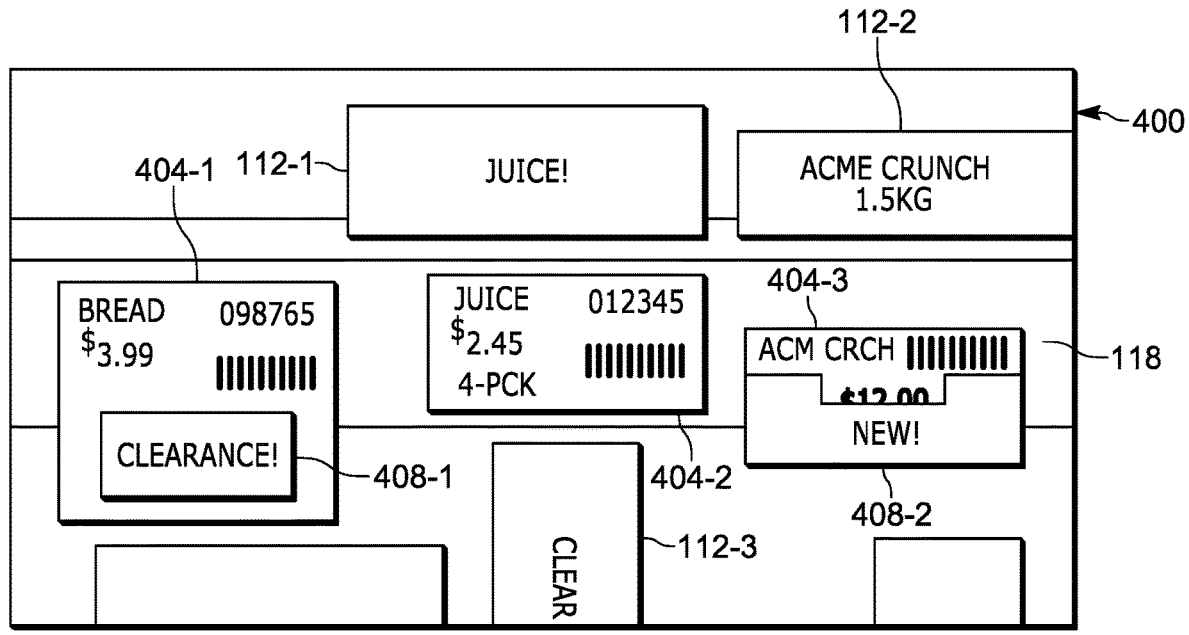
FIG. 4A is a diagram illustrating an example image obtained at block 305 of the method of FIG. 3.

Turning to FIG. 4A, an example image 400 of a portion of a shelf module 110 is shown. The image 400 depicts a shelf edge 118 of a shelf supporting products 112-1 and 112-2. Additional products, including a third product 112-3, are also partially depicted in the image 400. The shelf edge 118 also supports a plurality of primary labels 404-1, 404-2 and 404-3. As seen in FIG. 4A, each primary label 404 contains a barcode (e.g. encoding a universal product code (UPC), or other product identifier) as well as a price string.

Also shown in the image 400 are auxiliary labels 408-1 and 408-2. As will be apparent from FIG. 4A, the auxiliary labels do not contain product-specific information. Instead, the auxiliary labels contain promotion or other identifiers that can be applied to any product 112. That is, the primary labels correspond to specific products 112, while the auxiliary labels 408 do not correspond to any particular product 112, but instead are associated with certain products 112 by physical placement adjacent to primary labels 404. As shown in FIG. 4A, the auxiliary labels 408 can take various physical forms. The auxiliary label 408-1, for instance, is displayed on a common piece of label media with the label 404-1, while the auxiliary label 408-2 includes a separate piece of label media affixed to the shelf edge 118 adjacent to the label 404-3. Further, as illustrated in FIG. 4A, the placement of the auxiliary label 408-2 is such that it obstructs the price presented on the label 404-3.

Figure 4B:
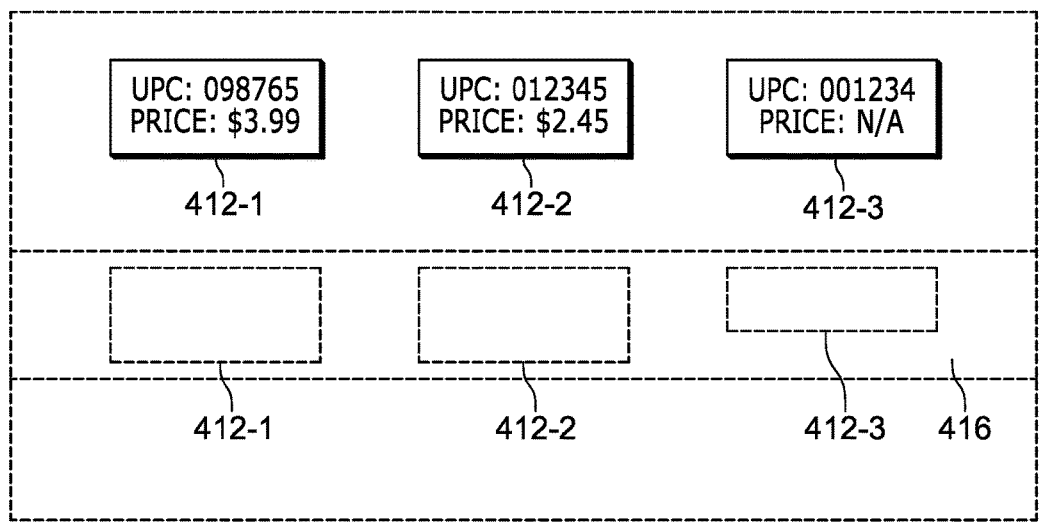
FIG. 4B is a diagram illustrating primary label indicators obtained along with the image of FIG. 4A.

FIG. 4B is a graphical presentation of the above-mentioned primary label indicators. In particular, three primary label indicators 412-1, 412-2 and 412-3 are illustrated, corresponding to the primary labels 404-1, 404-2 and 404-3 respectively. The primary label indicators 412 include both definitions of the bounding boxes shown in FIG. 4B, as well as data extracted from the image 400, such as the decoded UPC from barcodes and the price strings mentioned earlier. It will be understood that the primary label indicators need not be stored or obtained at block 305 in graphical form. For example, rather than storing bounding boxes in graphical form as shown in FIG. 4B, the primary label indicators can include corner coordinates of the bounding boxes.

Also illustrated in FIG. 4B is a reference indicator obtained at block 305. The reference indicator, as will be discussed herein, is employed by the server 101 to selection detection regions of the image 400 in which to search for auxiliary labels. The reference indicator, in the present example, is a shelf edge indicator 416 defining a bounding box corresponding to the location in the image 400 of the shelf edge 118. Detection of primary labels 404 and shelf edges 118 is performed prior to the performance of the method 300, for example by the server 101 or another suitable computing device. In other examples, as will be discussed below in greater detail, the reference indicator(s) obtained at block 305 is the primary label indicators 412 themselves (i.e. a separate reference indicator need not be obtained at block 305). In further examples, both the primary label indicators 412 and the shelf edge indicator 416 can be employed as reference indicators.

Figure 5:
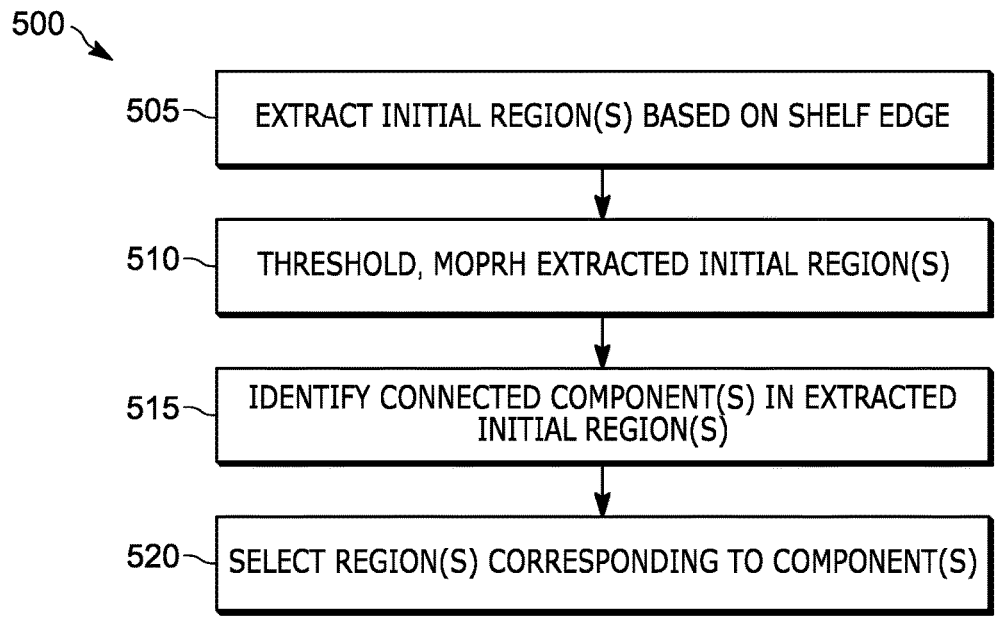
FIG. 5 is a flowchart of a method for selecting detection regions at block 310 of the method of FIG. 3.

Returning to FIG. 3, at block 310 the server 101 is configured to select one or more detection regions of the image 400 based on the reference indicator obtained at block 305. The detection regions selected at block 310 are portions of the image 400, in which the server 101 is configured to subsequently search for auxiliary labels based on known visual attributes of the auxiliary labels. The detection regions are selected at block 310 according to previously established spatial relationships between the auxiliary labels 408 and the reference indicator 416. In the present example, as seen in FIG. 4A, the auxiliary labels 408 are disposed on or below the shelf edge 118. The server 101 is therefore configured, at block 310, to identify regions of the image 400 in which to search for auxiliary labels 408 according to the position of the shelf edge 118 (as defined by the shelf edge indicator 416). Turning to FIG. 5, a method 500 of performing block 310 of the method 300 is illustrated, employing as reference indicator the shelf edge indicator 416.

Figure 6A:
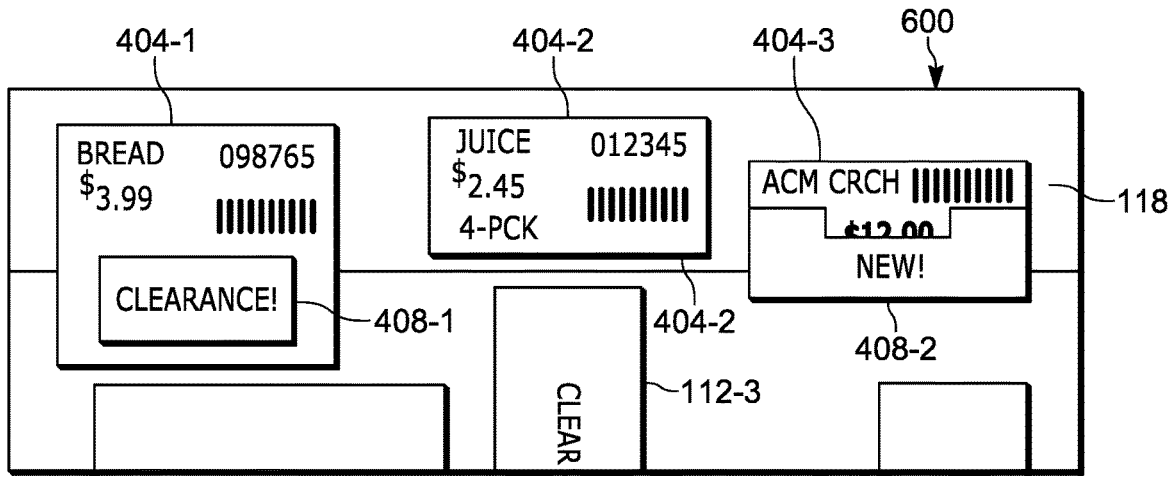
FIGS. 6A-6C are diagrams illustrating the performance of the method of FIG. 5.
Figure 6B:

At block 505, the server 101 is configured to extract an initial region of the image 400 based on the shelf edge indicator 416. FIG. 6A illustrates an initial region 600 of the image extracted at block 505, based on the knowledge that the auxiliary labels 408 are placed on or below the shelf edge 118. Returning to FIG. 5, at block 510 the server 101 is configured to convert the extracted initial region to a binary image (i.e. black and white) via a suitable thresholding operation, such as Otsu thresholding. The server 101 is further configured to apply one or more morphological operations, such as a closing operation (consisting of a dilation operation followed by an erosion operation). As seen in FIG. 6B, following the performance of block 510, an updated extracted region 604 is generated, in which the labels 404, auxiliary labels 408 and products 112 are represented by foreground blocks 608-1, 608-2, 608-3 and 608-4, while the remainder of the extracted initial region 600 is background.

Figure 6C:
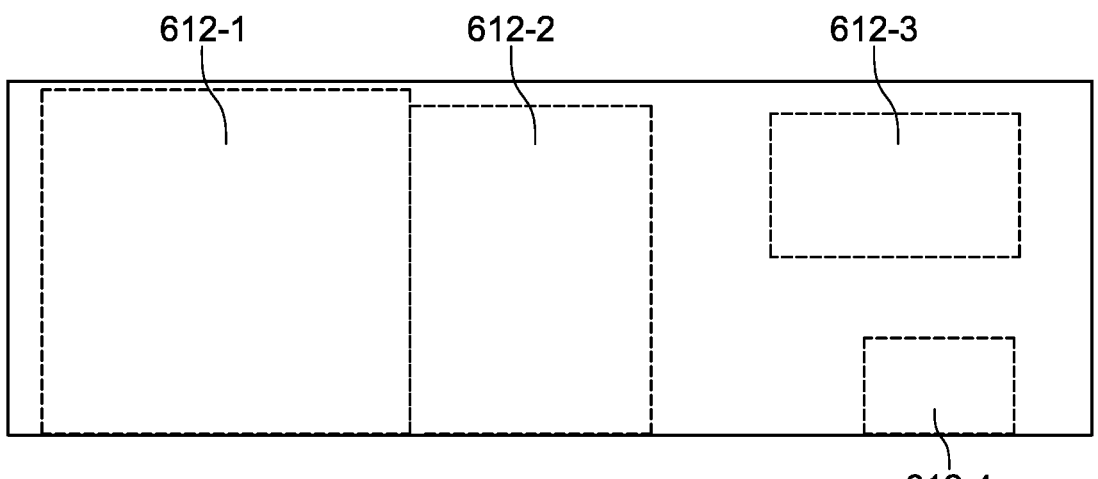

At block 515, the server 101 is configured to perform a blob extraction operation, also referred to as a connected components analysis, to identify the boundaries of the blocks 608. The blob extraction may be based on, for example, identifying edges in the updated extracted region 604. At block 520, the server 101 is configured to select detection regions corresponding to each blob (i.e. component) identified at block 515. The detection regions can correspond directly to the boundaries of the blobs. In other examples, as shown in FIG. 6C, the detection regions are selected as rectangular regions 612-1, 612-2, 612-3 and 612-4 encompassing the blobs detected at block 515.

Figures 7A, 7B:
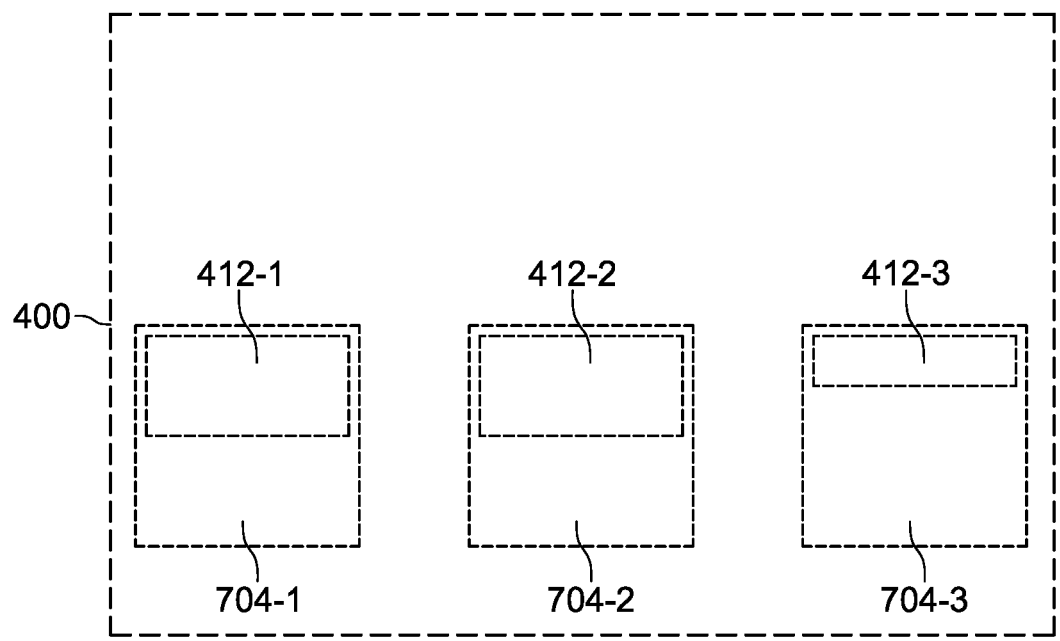
FIG. 7A is a flowchart of another method for selecting detection regions at block 310 of the method of FIG. 3.
FIG. 7B is a diagram illustrating the performance of the method of FIG. 7A.

Turning to FIG. 7A, in another embodiment the reference indicators obtained at block 305 are the primary label indicators 412 themselves. The performance of block 310 is therefore implemented as a method including a single step 700, at which the server 101 is configured to select detection regions based on each primary label indicator 412 and predefined spatial relationships between the primary label indicators 412 and the auxiliary labels. In the present example, as shown in FIG. 7B, a detection region 704 is selected for each primary label indicator 412, containing a region of the image 400 encompassing the primary label indicator 412 itself as well as a predefined region below the primary label indicator 412. Thus, three detection regions 704-1, 704-2 and 704-3 are selected via performance of the method 700.

Returning to FIG. 3, following the selection of detection regions at block 310, a classification operation is applied to each detection region to detect any auxiliary labels in the detection region. Specifically, at block 315 the server 101 is configured to select one of the detection regions and apply the above-mentioned classification operation to the detection region. Any of a variety of suitable classification operations can be employed by the server 101 at block 315. In the present example, the classification operation is based on the bag of visual words (BOVW) model. In particular, the server 101 is configured to identify a plurality of features in each of a set of training images, and to generate feature descriptors for each image. For example, the server 101 may be configured to apply the Oriented FAST and Rotated BRIEF (ORB) feature descriptor algorithm. The ORB algorithm includes the identification, in each of a plurality of training images of auxiliary labels, feature points such as corners. The algorithm further includes the generation of a binary feature vector corresponding to each feature point. Thus, each training image is described by a descriptor containing the binary feature vectors of each feature point. The server 101 is then configured to generate classification parameters according to a suitable machine learning algorithm, such as k-means clustering, based on the image descriptors.

Figure 8A:
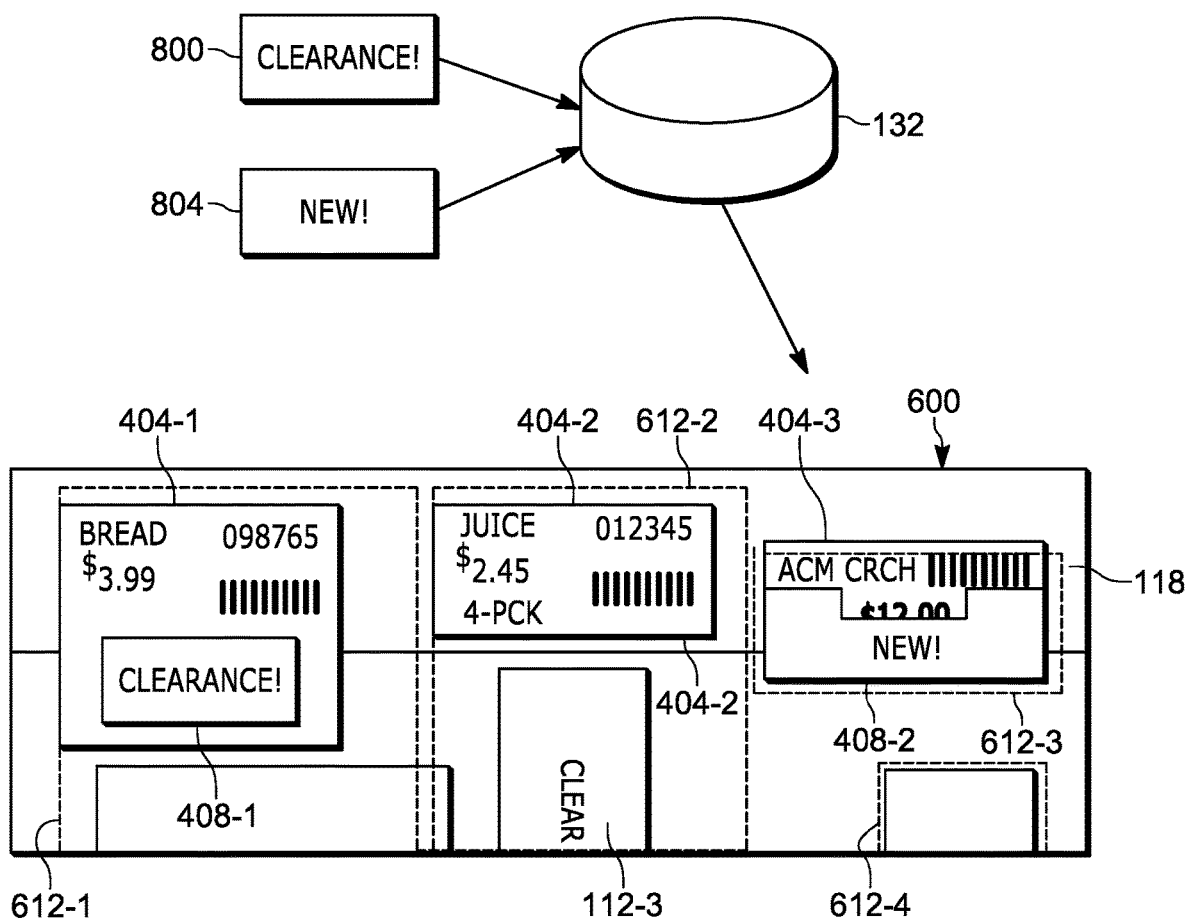
FIGS. 8A-8B are diagrams illustrating the performance of block 315 of the method of FIG. 3.

Turning to FIG. 8A, example training images 800 and 804 of certain features of the auxiliary labels 412 are shown, from which the above-mentioned classification parameters are generated (typically, multiple training images for each type of auxiliary label are employed). In an example performance of block 315, the server 101 is configured to apply the above-mentioned classification parameters to the detection region 612-2. FIG. 8A illustrates the detection regions overlaid on the extracted portion 600 of the image 400. At block 320, the server 101 is configured to determine whether any auxiliary labels were detected in the current detection region.

Figure 8B:
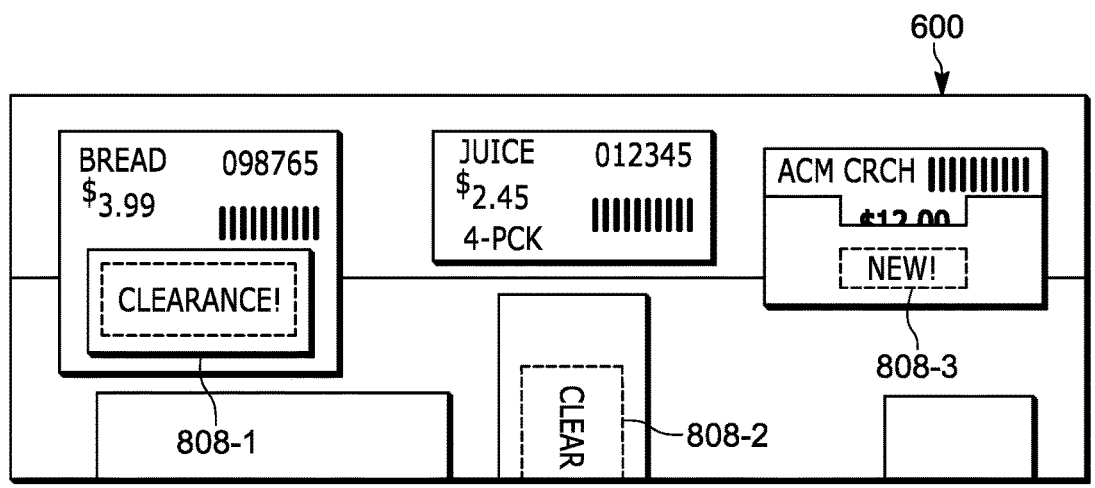

As seen in FIG. 8B, classification of the detection region 612-2 results in a detection of an auxiliary label indicator 808-2. The classification generated at block 315 specifies the type of the auxiliary label (i.e. "Clearance" or "New", although any of a variety of other type names may be applied to the auxiliary labels), as well as a transformation matrix (also referred to as a homography matrix) indicating the position of the detected auxiliary label relative to a reference auxiliary label (e.g. the images 800 and 804 shown in FIG. 8A). As seen in FIG. 8B, the auxiliary label indicator 808-2 is oriented at an angle of 90 degrees relative to the reference image 800.

Returning to FIG. 3, the determination at block 320 is therefore affirmative and the server 101 is configured to determine, at block 325, whether the orientation of the detected auxiliary label exceeds a predefined threshold. The threshold is set based on expected physical orientations of the auxiliary labels 412 on the shelves 110, and may permit the server 101 to discard false positive classifications arising from block 315. For example, the threshold may be set at about 30 degrees, indicating that any detected auxiliary label having an orientation of more than 30 degrees relative to the reference image 800 or 804 is likely to be a false positive detection rather than an actual auxiliary label 412. Thus, in the present example (in which the auxiliary label indicator 808-2 is at an orientation of ninety degrees) the determination at block 325 is affirmative, and the auxiliary label indicator 808-2 is discarded at block 330. In other embodiments, at block 325 the server 101 is configured to validate the detected auxiliary label by determining whether the detected auxiliary label indicates the presence of a primary label satisfying one or more structural conditions. That is, the server 101 is configured to determine the expected position and orientation of a primary label in the captured image based on a known spatial relationship between auxiliary labels and primary labels. When the expected position and orientation of the primary label does not satisfy the above-mentioned conditions, the detection at block 320 may have been erroneous, and can be discarded.

In such embodiments, the server 101 is configured to determine, based on the detected auxiliary label, the position and orientation of a corresponding primary label. For example, the server 101 can be configured to identify a plurality of predefined landmark points in the detected auxiliary label. The server 101 stores predefined spatial relationships between the landmarks and a reference image of a primary label (e.g. a distance and direction from each landmark to the corners of the reference primary label). Thus, by detecting the landmarks, the server 101 can be configured to determine a transformation between the reference primary label and the primary label as depicted in the image (i.e. a homography between the reference primary label and the captured image). The detection of landmarks and determination of expected position of the primary label is discussed in further detail in connection with FIG. 9.

Having determined an expected position and orientation of the primary label from the detected auxiliary label, the server 101 is configured to determine whether the expected position and orientation of the primary label satisfies one or more structural conditions. For example, when the reference primary label is a rectangle, the server 101 can be configured to identify each corner of the expected primary label position, and to determine the internal angles of the corners. If any of the internal angles are below a threshold (e.g. 70 degrees), the server 101 determines at block 325 that the detected auxiliary label is a false positive detection, and proceeds to block 330. Other examples of structural conditions evaluated at block 325 in such embodiments include an aspect ratio condition, in which the server 101 determines the aspect ratio of dimensions of the expected primary label, and determines whether the aspect ratio is within a predefined range of a reference aspect ratio for the primary label.

Following block 330, the server 101 is configured to determine, at block 335, whether any detection regions remain to be processed. In the present example, the determination at block 335 is affirmative, and therefore at block 315 the next detection region (e.g. the region 612-4) is selected. As will be apparent from FIG. 8A, the detection region 612-4 does not contain any auxiliary labels, and the determination at block 320 is therefore negative. A further performance of block 315, for the detection region 612-1, leads to the detection of the auxiliary label 408-1 (more specifically, the auxiliary label indicator 808-1 shown in FIG. 8B). The orientation of the auxiliary label indicator 808-1 is equal to that of the reference image 800, and the determination at block 325 is therefore negative. At block 340, therefore, the auxiliary label indicator 808-1 is stored in the memory 122 for further processing. A final performance of blocks 315, 320, 325 and 340 leads to the detection and storage of an auxiliary label indicator 808-3, shown in FIG. 8B. Following a negative determination at block 335, performance of the method 300 proceeds to block 345.

At block 345, the server 101 is configured to select, for each auxiliary label indicator 808 stored at block 340, one of the primary label indicators 412 to associate with the auxiliary label indicator 808. The selection at block 345 is based on proximity between the current auxiliary label indicator 808 and the primary label indicators 412. For example, the server 101 can be configured to determine the center of each auxiliary label indicator 808, and select the primary label indicator 412 having the closest center to that of the auxiliary label indicator 808. At block 350, the server 101 is configured to update the selected primary label indicator 412 to include the type (i.e. class) of the associated auxiliary label indicator. The above process is repeated for each auxiliary label indicator stored at block 340. The updated primary label indicators 412 are stored in the memory 122 (e.g. in the repository 132), for example for transmission to another computing device (e.g. to the client device 105 for display), use in further processing of the data captured by the apparatus 103, or the like.

Figure 9:
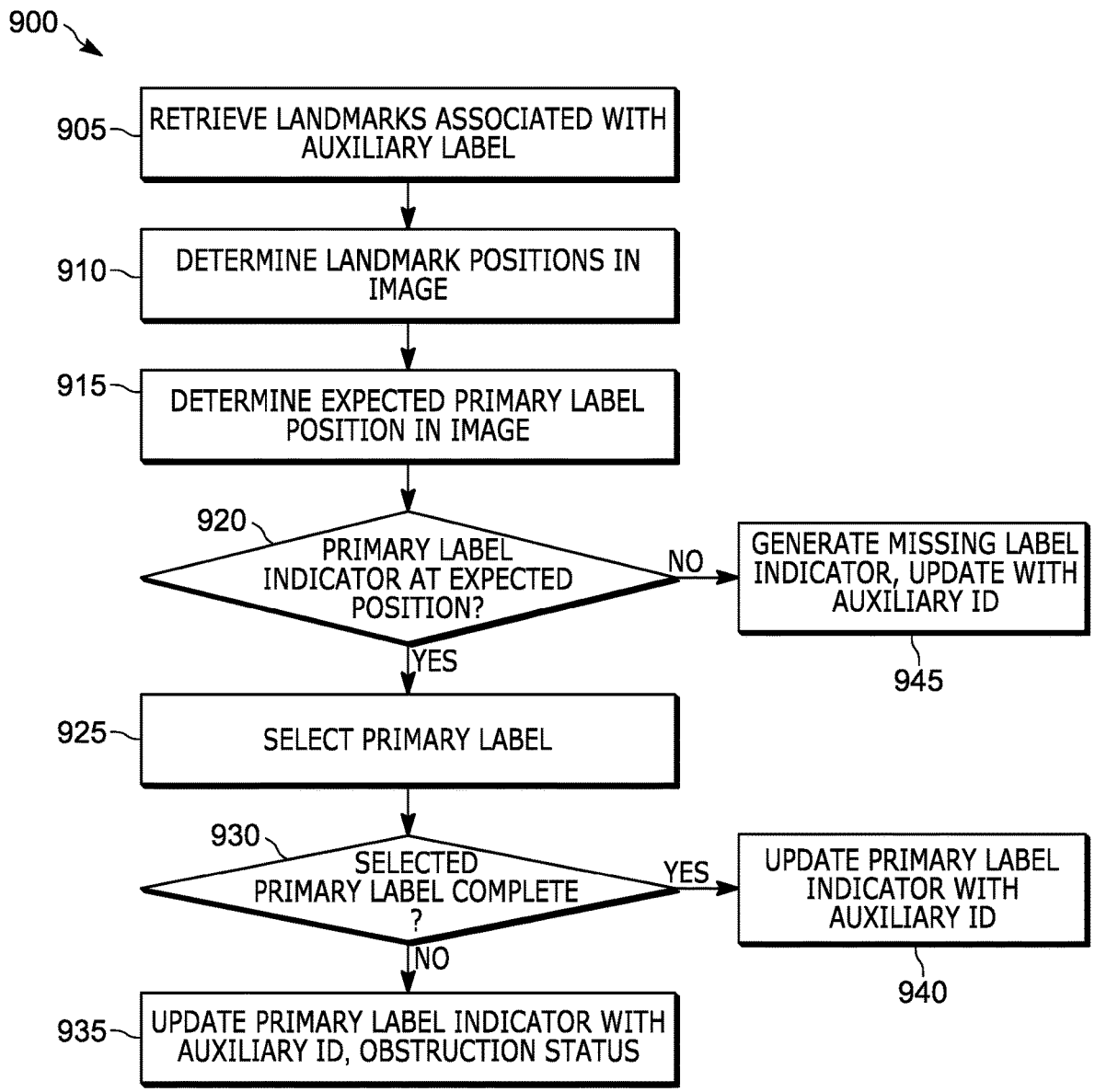
FIG. 9 is a flowchart of a method for performing blocks 345-350 of the method of FIG. 3.

In some examples, the server 101 is configured to perform blocks 345 and 350 by using additional data stored in conjunction with the reference images 800 and 804 employed to identify the auxiliary label indicators 808. Turning to FIG. 9, a method 900 of associating primary and auxiliary label indicators and updating the primary label indicators accordingly is shown (i.e. a method of performing blocks 345 and 350).

Figure 10A:
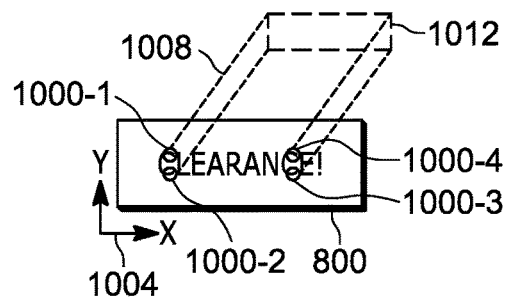
FIGS. 10A-10B are diagram illustrating the use of landmarks in the performance of the method of FIG. 9.

At block 905, the server 101 is configured to retrieve, from the memory 122, landmarks associated with each auxiliary label indicator 808. The landmarks are predefined points within the reference images 800 and 804. Turning to FIG. 10A, example landmarks 1000-1, 1000-2, 1000-3 and 1000-4 are shown in association with the reference image 800. The landmarks 1000 are defined in the memory 122 by their coordinates within the reference image 800, relative to a frame of reference 1004. The memory 122 also stores relative positions 1008 (e.g. in the form of distances according to the frame of reference 1004) of each landmark 1000 to a corner of an expected primary label indicator position 1012. The expected position 1012, in the illustrated embodiment, is the expected position of a barcode of a primary label 404 relative to the auxiliary label 408. In other examples, the expected position 1012 can be the position of the entire label 404, or of another component of the label 404 (e.g. a price string).

Figure 10B:
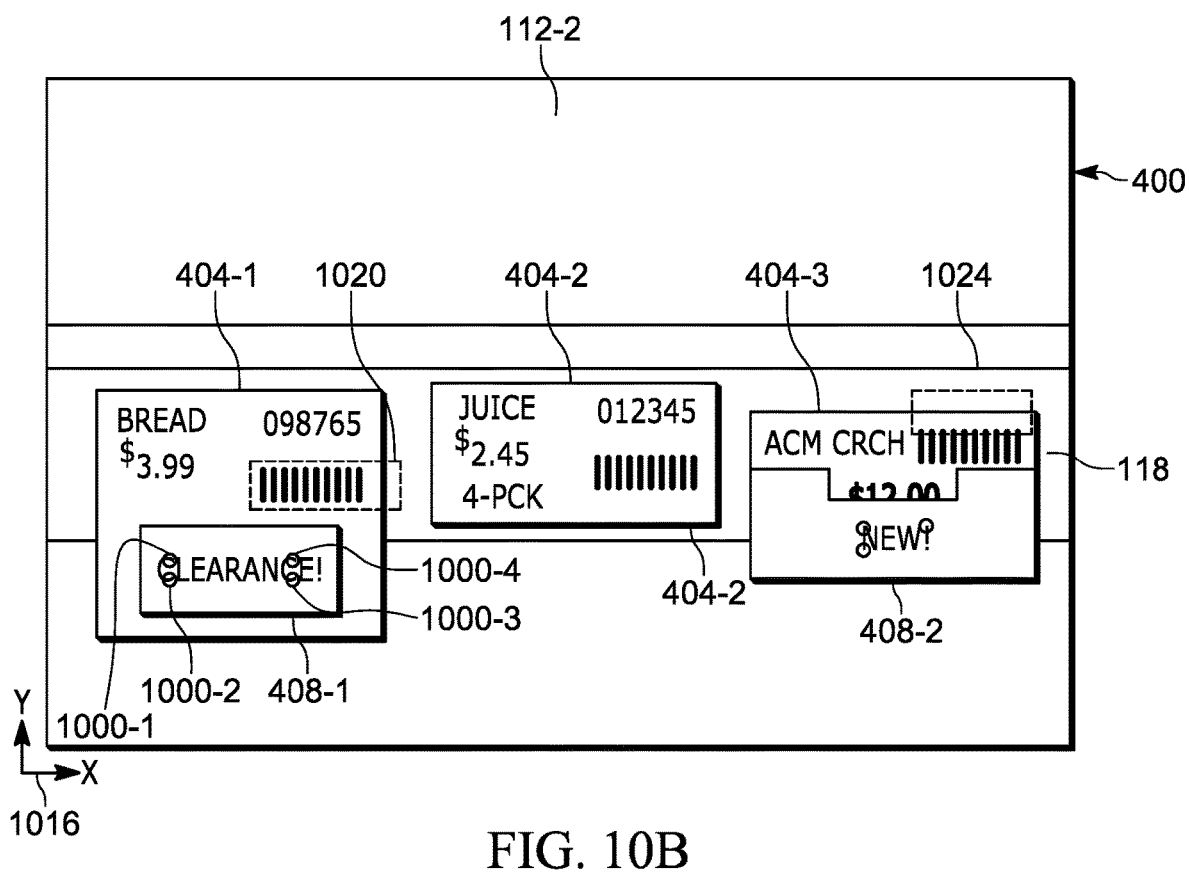

Returning to FIG. 9, at block 910 the server 101 is configured to determine the equivalent positions of the landmarks 1000 in the image 400, based on the transformation matrix obtained at block 315. In other words, the positions of the landmarks 1000 in an image frame of reference 1016, as shown in FIG. 10B are determined at block 910.

At block 915, the server 101 is configured to determine, based on the landmarks as positioned in the image 400 and on the expected positions 1008, an expected position for a primary label indicator 412. At block 920, the server 101 is configured to determine whether a primary label indicator 412 is located at the expected position. The server 101 may be configured to apply a predefined tolerance to the determination at block 920, permitting a degree of flexibility in the placement of primary labels 404 relative to auxiliary labels 408. In the present example, as shown in FIG. 10B, an expected position 1020 for the auxiliary label indicator 808-1 matches the location of the barcode of the primary label 404-1. The determination at block 920 is therefore affirmative. The expected position 1024 for the auxiliary label indicator 808-2, however, does not match the position of the barcode on the primary label 404-3. It is assumed, in the present example, that the difference in position between the expected position 1024 and the actual barcode position is within the above-noted tolerance, and the determination at block 920 is therefore also affirmative.

Referring again to FIG. 9, following an affirmative determination at block 920, at block 925 the server 101 is configured to select the primary label identified at block 920. Thus, for the auxiliary label indicator 808-1 the primary label indicator 412-1 is selected, and for the auxiliary label indicator 808-2 the primary label indicator 412-3 is selected. At block 930, the server 101 is configured to determine, for each selected primary label indicator 412, whether the selected primary label indicator 412 is complete. Specifically, the server 101 is configured to determine whether each of a predefined set of expected attributes of the primary label indicator 412 is present for the primary label indicator 412. Referring to FIG. 4B, for example, the price attribute for the primary label indicator 412-3 is null, as the server 101 was unable to detect a price string for the primary label 404-1. The determination at block 930 is therefore negative, and at block 935 the server 101 is configured to update the primary label indicator 412-3 with the type of the auxiliary label indicator 808-2 (e.g. "New"), as well as an obstruction status indicator. The obstruction status indicator indicates that the primary label 404-3 is present but may be obstructed (in the illustrated case, by the auxiliary label 408-2 itself).

Figure 11:
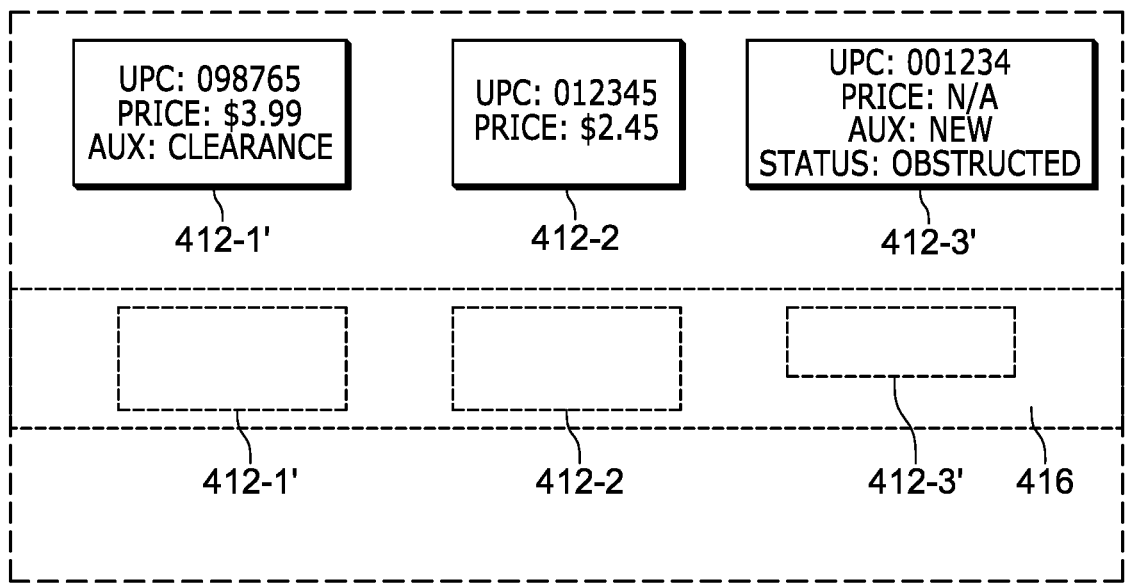
FIG. 11 is a diagram illustrating updated primary label indicators following the performance of the method of FIG. 3.

For the primary label indicator 412-1, on the other hand, the determination at block 930 is affirmative, and at block 935 the server 101 is configured to update the primary label indicator 412-1 with the type of the auxiliary label indicator 808-1 (e.g. "Clearance") at block 940. FIG. 11 illustrates the updated primary label indicators 412. In particular, the primary label indicators 412-1 and 412-3 appear as updated indicators 412-1' and 412-3', and each contain an auxiliary label type or class, as well as an obstruction indicator (in the case of the primary label indicator 412-3').

Returning to FIG. 9, when the determination at block 920 is negative (i.e. when no primary label indicator is at the expected position defined by the relative positions 1008), the server 101 can be configured at block 945 to generate a new primary label indicator, indicating the presence of a missing primary label at the expected location. The newly generated primary label indicator can also include the type of the associated auxiliary label indicator 808.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of auxiliary label detection, comprising:
    at an imaging controller, obtaining (i) an image of a support structure and (ii) a plurality of primary label indicators each defining a position of a primary label within the image;
    at the imaging controller, selecting a detection region from the image based on obtaining a support structure edge indicator defining a position of the support structure edge within the image;
    at the imaging controller, detecting an auxiliary label within the detection region based on predefined visual attributes of the auxiliary label;
    at the imaging controller, selecting one of the primary label indicators based on proximity between the auxiliary label and the selected primary label indicator;
    updating the selected primary label indicator with an identifier of the auxiliary label; and
    storing the updated primary label indicator in a memory.

2. The method of claim 1, wherein selecting the detection region further comprises:
    extracting an initial region of the image based on the support structure edge indicator;
    identifying a blob in the extracted initial region; and
    selecting the detection region corresponding to the blob.

3. The method of claim 1, wherein detecting the auxiliary label includes detecting an orientation of the auxiliary label relative to a reference orientation; the method further comprising:
    determining whether the orientation exceeds a predefined threshold; and
    when the orientation exceeds the predefined threshold, discarding the auxiliary label detection.

4. The method of claim 3, further comprising:
    when the orientation does not exceed the threshold, storing an auxiliary label indicator in the memory, defining (i) a position of the auxiliary label within the image and (ii) a type of the auxiliary label.

5. The method of claim 1, wherein detecting the auxiliary label includes detecting a position and a type of the auxiliary label; and
    wherein updating the primary label indicator includes inserting the type of the auxiliary label into the primary label indicator.

6. The method of claim 5, wherein selecting the one of the primary label indicators comprises:
    determining an expected primary label position based on the position of the auxiliary label;
    determining whether one of the primary label indicators is at the expected position; and
    when one of the primary label indicators is at the expected position, selecting the one of the primary label indicators.

7. The method of claim 6, further comprising:
    determining whether the selected primary label indicator is complete; and when the selected primary label indicator is not complete, updating the primary label indicator with an obstructed status indicator.

8. A computing device for auxiliary label detection, the computing device comprising:
a memory storing (i) an image of a support structure and (ii) a plurality of primary label indicators each defining a position of a primary label within the image;
an imaging controller connected to the memory, the imaging controller configured to obtain the image of the support structure and the plurality of primary label indicators;
the imaging controller further configured to select a detection region from the image based on obtaining a support structure edge indicator defining a position of the support structure edge within the image;
the imaging controller further configured to detect an auxiliary label within the detection region based on predefined visual attributes of the auxiliary label;
the imaging controller further configured to select one of the primary label indicators based on proximity between the auxiliary label and the selected primary label indicator;
the imaging controller further configured to update the selected primary label indicator with an identifier of the auxiliary label; and
the imaging controller further configured to store the updated primary label indicator in the memory.

9. The computing device of claim 8, further comprising:
a communications interface connected to the imaging controller;
wherein the imaging controller is further configured to transmit the updated primary label indicator via the communications interface.

10. The computing device of claim 8, wherein the imaging controller is further configured, to select, the detection region, to:
extract an initial region of the image based on the support structure edge indicator;
identify a blob in the extracted initial region; and
select the detection region corresponding to the blob.

11. The computing device of claim 8, wherein the imaging controller is further configured, to detect the auxiliary label, to detect an orientation of the auxiliary label relative to a reference orientation; and
wherein the imaging controller is further configured to:
determine whether the orientation exceeds a predefined threshold; and
when the orientation exceeds the predefined threshold, discard the auxiliary label detection.

12. The computing device of claim 11, wherein the imaging controller is further configured to:
when the orientation does not exceed the threshold, store an auxiliary label indicator in the memory, defining (i) a position of the auxiliary label within the image and (ii) a type of the auxiliary label.

13. The computing device of claim 8, wherein the imaging controller is further configured, to detect the auxiliary label, to detect a position and a type of the auxiliary label; and
wherein the imaging controller is further configured, to update the primary label indicator, to insert the type of the auxiliary label into the primary label indicator.

14. The computing device of claim 13, wherein the imaging controller is further configured, to select the one of the primary label indicators, to:
determine an expected primary label position based on the position of the auxiliary label;
determine whether one of the primary label indicators is at the expected position; and
when one of the primary label indicators is at the expected position, select the one of the primary label indicators.

15. The computing device of claim 14, wherein the imaging controller is further configured to:
determine whether the selected primary label indicator is complete; and
when the selected primary label indicator is not complete, update the primary label indicator with an obstructed status indicator.

16. A non-transitory computer-readable medium storing a plurality of computer-readable instructions executable by an imaging controller, wherein execution of the instructions causes the imaging controller to:
obtain (i) an image of a support structure and (ii) a plurality of primary label indicators each defining a position of a primary label within the image;
select a detection region from the image based on a support structure edge indicator defining a position of the support structure edge within the image;
detect an auxiliary label within the detection region based on predefined visual attributes of the auxiliary label;
select one of the primary label indicators based on proximity between the auxiliary label and the selected primary label indicator;
update the selected primary label indicator with an identifier of the auxiliary label; and store the updated primary label indicator in a memory.

* * * * *